Jan. 18, 1955  A. M. VAN DIJK  2,699,860
CONVEYER FOR CONVEYING LOOSE MATERIAL
SUCH AS COAL IN COAL MINES
Filed Jan. 5, 1953  3 Sheets-Sheet 2
FIG.4
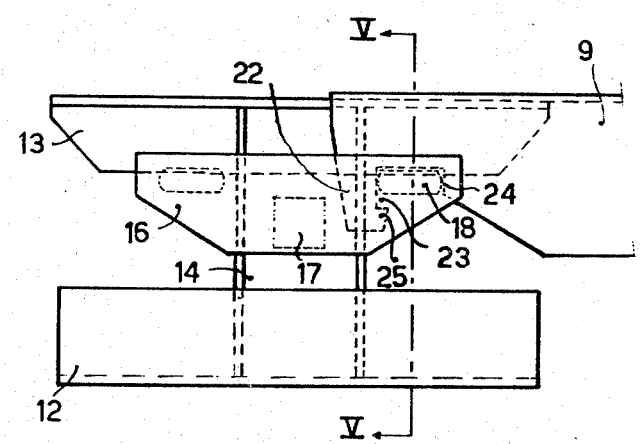
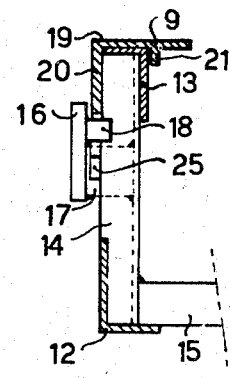
FIG.5
Inventor:
Arend M. Van Dijk
By Cushman, Darby & Cushman
Attorneys Jan. 18, 1955    A. M. VAN DIJK    2,699,860
CONVEYER FOR CONVEYING LOOSE MATERIAL
SUCH AS COAL IN COAL MINES
Filed Jan. 5, 1953    3 Sheets-Sheet 3

United States Patent Office 2,699,860
Patented Jan. 18, 1955

2,699,860

CONVEYER FOR CONVEYING LOOSE MATERIAL SUCH AS COAL IN COAL MINES

Arend M. Van Dijk, Terwinselen, Netherlands, assignor to Stamicarbon N. V., Heerlen, Netherlands Application January 5, 1953, Serial No. 329,581

6 Claims. (Cl. 198—184)

This invention relates to a conveyor for conveying loose material such as coal in coal mines. More particularly, the invention relates to a conveyor of the type comprising an endless belt which travels over idler rollers rotatable in bearings mounted on a supporting frame, which is built up of several sections, whose longitudinals or beams are supported by terminal stools and connected thereto by means of co-operating studs and recesses on the respective parts.

A conveyor of this type is described in the James Thomson Patent No. 2,551,513, issued May 1, 1951, and advantageously may be used for conveying coal in coal mines as the various parts constituting the supporting structure can rapidly be erected, extended or dismantled without the use of tools.

In the prior structures lifting movement of the longitudinal beams is prevented save to a limited extent by means of projections extending endwise from the beams, these projections having a nose engaging beneath a square boss attached to the stools. This complicates the construction and moreover necessitates use of stools wherein the distance between the studs and recesses serving to interlock the beams against endwise displacement must be fixed, because otherwise the nose will not project sufficiently far beneath the boss to prevent lifting of the beams.

It is an object of the invention to provide a sectional supporting frame for an endless belt conveyor in which the connecting means for the parts of the frame is of a very simple construction.

Another object of the invention is to provide a sectional supporting frame for an endless belt conveyor in which the use of standard stools having a predetermined distance between the pins or recesses is not required.

A further object of the invention is to provide a sectional supporting frame for an endless belt conveyor in which the studs for interconnecting the stools and the longitudinals or beams have a great resistance against bending.

With these and other objects in view the invention will hereinafter be described with reference to the accompanying drawings, in which Fig. 1 is an elevation of a section of a belt conveyor, with portions omitted;

Fig. 4 is an elevation on a larger scale of a stool with a beam attached;

Fig. 5 is a section on the line V—V in Figure 4;

Figure 1:
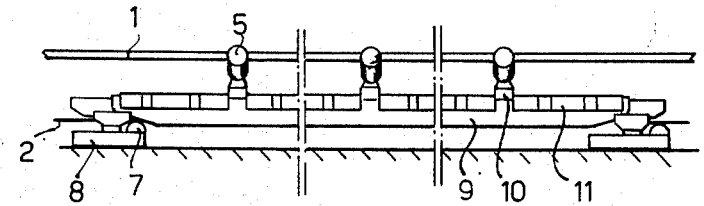
Figure 2:
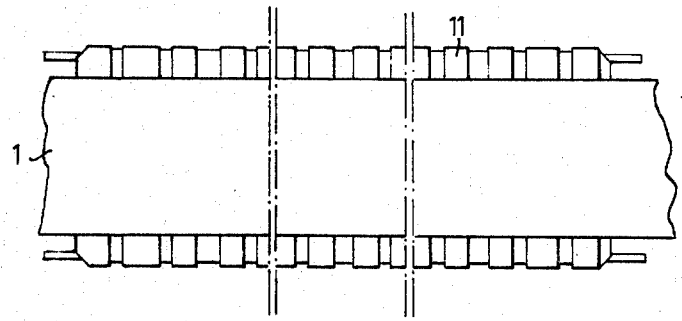
Fig. 2 is a corresponding plan view.
Figure 3:
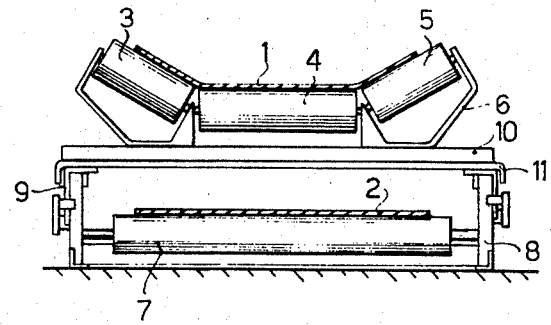
Fig. 3 is an end view of the conveyor.

Referring to the drawings in which like parts are indicated by like reference numerals, the conveyor comprises an endless belt, the upper run 1 of which travels over sets of three idler rollers 3, 4 and 5 which are rotatable in bearing brackets 6. Each set of these rollers is arranged in such a manner as to keep the belt in a troughlike shape as shown in Figure 3. The lower run 2 of the belt travels over single idler rollers 7 supported in the standards or stools 8.

The supporting structure of the conveyor is composed of a plurality of sections, each section comprising a stool 8, a pair of laterally spaced longitudinals 9, a number of idler boards 10 and cover plates 11.

Figure 6:
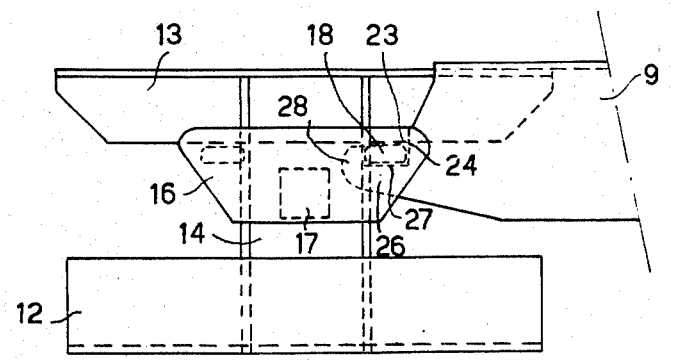
Fig. 6 is an elevation of a modified construction.

The stools 8 are constructed to provide two ends to thereby support two parallel longitudinals 9, each end being provided with a base 12 to bear on the floor or on concrete blocks placed on the floor, and with a supporting bar 13 on which the beams 9 may rest. The base 12 and supporting bar 13 of each end are interconnected by a vertical standard 14 of suitable length and both ends of a stool are connected by means of a cross bar 15. Furthermore, each end of each stool is provided with a coupling plate 16, fixed to the standard 14 by means of a spacer 17. The coupling plates 16 may be welded to the spacers 17 but, if desired, they may be pivotally connected thereto. In the device of Figures 4 to 6 the coupling plates 16 are provided with studs 18 projecting inwardly toward the standards 14, these studs being arranged to cooperate with the beams 9.

The longitudinals or beams 9 are right-angled in crosssection to include a horizontal flange 19 and a downwardly extending vertical flange 20. On the lower surface of the ends of the flange 19 a shoulder 21 is provided to form a channel to fit over the supporting bar 13. Hence, a line of conveyor sections always will be in perfect alignment. In the embodiment according to Figures 4 and 5, each end of the vertical flange of a beam 9 is provided with a downwardly extending projection 22 so that a recess 23 is formed at the end of that flange. Each stud 18 on the coupling plates 16 is so disposed that when a beam and stool are connected as shown in Figures 4 and 5, the left and right hand surfaces (Figure 4) of stud 18 respectively will be engaged by the opposed face of projection 22 and the opposite face 24 of recess 23, so that the movement of the beams 9 in a longitudinal direction is restricted. The projections 22 are provided with a hooklike member 25 extending inwardly beneath stud 18, so that upward movement of the beams 9 is prevented except to a limited extent.

The studs 18 have an oblong cross-section, with their major dimension substantially parallel to the line of the conveyor. This permits forming the recesses 23 in such a way that the opening between the tip of hook or nose 25 and the lower end of the vertical end face 24 of the beam is smaller than the major dimension of a stud 18 and somewhat larger than the smaller dimension of a stud.

In assembling the conveyor, a stool 8 or the beams 9 are held in an oblique position so that the pins 18 may enter the opening between a hook 25 and the opposed end face 24, and then the elements are swung into the relationship shown in Figure 4, wherein the studs 18 properly fit in the recesses 23. The clearance in a vertical direction is now smaller as compared with assemblies using studs having a circular cross-section, though the hook of the present invention has a length sufficient to prevent upward movement of the beams 9. In addition, the resistance against bending of the studs 18 due to horizontal forces is considerably increased without increasing the dimensions of the studs 18 in a vertical sense. The studs 18 fit in the recesses 23 with only a small horizontal clearance. In order to make it possible for the conveyor to adjust itself to unevennesses of the surface on which the stools rest, the beams 9 must be capable of a slight pivotal movement relative to the studs 18. To this end the shorter or vertically disposed surfaces of the studs 18 are arcuate about a common centre.

The conveyor construction described can be erected to any desired length without the use of tools by assembling the required number of sections end to end, after which movement of the beams 9 except to a limited extent in vertical and horizontal directions is prevented, so that the beams 9 and stools 8 cannot come loose of their own accord when coupled.

The coupling of the beams 9 to the stools 8 may be effected irrespective of the distance between the pins 18 of a stool. Consequently the manufacture of the stools 8 and particularly the coupling plates 16 need not be so accurate as in the prior constructions. Furthermore, the present invention makes possible use of stools in which the distance between the coupling elements is adjustable, as described in my application Case 522–A, filed of even date herewith.

In the embodiment shown in Figure 6 the ends of the longitudinals or beams 9 are provided with a substantially horizontal projection 26 in which a recess 23 is provided which is open at the top, so that the bottom 27 of recess 23 can serve as a stop face against stud 18 to prevent upward movement of the beams 9. Thus, pin 18 is horizontally enclosed between the vertical end face 24 of the beam and the upwardly directed nose 28 of the extension 26, and vertical movement of the beams 9 is limited by face 27 and supporting bar 13.

Figure 7:
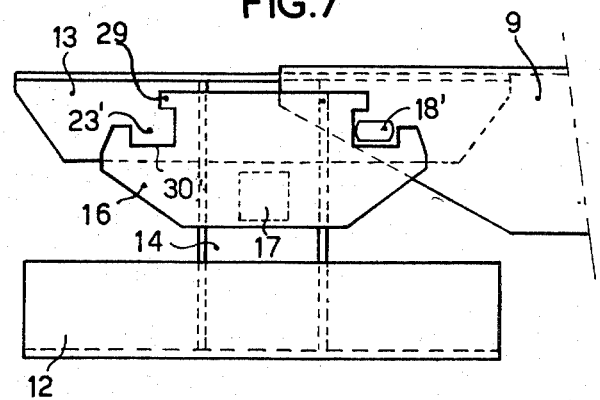
Fig. 7 is an elevation of a second modification.

In the embodiment according to Figure 7 the ends of the vertical flanges of the beams 9 are provided with pins 18'. The coupling plate 16 is provided with recesses 23' and hooks 29 overhanging those recesses, so that the pins 18' in a vertical sense are positioned between the bottoms 30 of the recesses 23' and the overhanging hooks 29.

The terminology used in the specification is for the purpose of description and not of limitation, the scope of the invention being defined in the claims.

I claim:

1. In a conveyor structure, a stool element, a beam element, and means to connect said elements comprising a stud on one of said elements, an edge of the other of said elements being provided with a recess adapted to receive said stud, said recess including an inner horizontal face and vertical faces extending from each end thereof, one of said vertical faces terminating in a hook extending toward the other face and of less horizontal extent than the corresponding dimension of said stud, said stud being oblong in transverse section with its major transverse dimension disposed parallel to the horizontal face of the recess.

2. A conveyor structure of the character described in claim 1 wherein said recess vertical face which terminates in a hook is of greater vertical length than the corresponding dimension of said stud.

3. A conveyor structure of the character described in claim 1 wherein said recess vertical face which terminates in a hook is of greater vertical length than the corresponding dimension of said stud, and said other recess vertical face is of substantially the same length as the corresponding dimension of said stud.

4. A conveyor structure of the character described in claim 1 wherein said beam element is provided with the recess on a lower edge.

5. A conveyor structure of the character described in claim 1 wherein said stool element is provided with the recess and the recess faces upwardly.

6. A conveyor structure of the character described in claim 1 wherein the surfaces of the minor dimension of said stud are arcuate and convex.

References Cited in the file of this patent

UNITED STATES PATENTS 2,551,513   Thomson _____ May 1, 1951